(12) United States Patent
Simelgor et al.

(10) Patent No.: US 7,741,603 B2
(45) Date of Patent: Jun. 22, 2010

(54) MICROCANTILEVER INFRARED SENSOR ARRAY

(75) Inventors: Gregory Simelgor, Ithaca, NY (US); Scott R. Hunter, Oak Ridge, TN (US)

(73) Assignee: Agiltron, Inc., Woburn, MA (US)

( * ) Notice: Subject to any disclaimer, the term of this patent is extended or adjusted under 35 U.S.C. 154(b) by 511 days.

(21) Appl. No.: 11/688,752

(22) Filed: Mar. 20, 2007

(65) Prior Publication Data
US 2008/0230699 A1 Sep. 25, 2008

(51) Int. Cl.
*G01J 5/00* (2006.01)
(52) U.S. Cl. .................................. 250/338.1
(58) Field of Classification Search ............ None
See application file for complete search history.

(56) References Cited

U.S. PATENT DOCUMENTS

| | | | |
|---|---|---|---|
| 5,844,238 | A | 12/1998 | Sauer et al. |
| 6,339,219 | B1 | 1/2002 | Ishizuya et al. |
| 2002/0153486 | A1* | 10/2002 | Ishizuya et al. .......... 250/338.1 |
| 2007/0272864 | A1* | 11/2007 | Li et al. ................... 250/338.4 |

OTHER PUBLICATIONS

Corbeil et al., "Self-leveling" uncooled microcantilever thermal detector, Applied Physics Letters, Aug. 12, 2002, 1306-1308, vol. 81, No. 7, American Institute of Physics.
Tohru Ishizuya et al, 160×120 Pixels of Optically Readable BiMaterial Infrared Detector, IEEE, pp. 578-581, 2002 IEEE.
J. Zhao, High Sensitivity Photomechanical MW-LWIR Imaging using an Uncooled MEMS Microcantilever Array and Optical Readout, Infrared Technology and Applications XXXI, pp. 506-513, SPIE, vol. 5783, Bellingham, WA.
Tohru Ishizuya, et al., Optically Readable Bi-material Infrared Detector, Infrared Technology and Applications XXVII, pp. 342-349, SPIE vol. 4369, 2001.

* cited by examiner

*Primary Examiner*—David P Porta
*Assistant Examiner*—Carolyn Igyarto
(74) *Attorney, Agent, or Firm*—Burns & Levinson LLP; Jacob N. Erlich; Orlando Lopez

(57) ABSTRACT

A radiation sensor array that exhibits improved fill factor is disclosed. The radiation sensor array incorporates sensors having support arms that are nested in vertical fashion with the support arms of neighboring sensors. This vertically-nested structure enables the radiation-sensing portions of the sensors to be more closely-packed.

15 Claims, 6 Drawing Sheets

MICROCANTILEVER INFRARED SENSOR ARRAY

CROSS REFERENCE TO RELATED APPLICATIONS

The underlying concepts, but not necessarily the language, of the following case is incorporated by reference: U.S. patent application Ser. No. 11/279,954, filed 17 Apr. 2006. Furthermore, this case is related to U.S. patent application Ser. No. 11/688,745, filed on even date herewith, and incorporated by reference herein. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to radiation sensors in general, and, more particularly, to MEMS radiation sensor arrays.

BACKGROUND OF THE INVENTION

A digital camera typically utilizes a two-dimensional array of sensors, each of which converts incident radiation into an electrical signal. The array of sensors is typically disposed at the focal point of a lens, thereby defining a "focal plane array." Infrared cameras include sensors that are sensitive to electromagnetic radiation having wavelengths longer than about 0.8 microns. Traditionally, infrared cameras have been based upon microbolometer technology. A microbolometer is an extremely small heat sensor, comprising materials such as vanadium-oxide or amorphous silicon, whose electrical resistance changes when it receives radiation of a specific wavelength. Microbolometers, however, exhibit self-heating effects, poor sensitivity, and generate electrical noise. To overcome these problems, capacitive radiation sensors based on Micro Electro Mechanical Systems (MEMS) technology have been developed.

In a typical MEMS-based radiation sensor, a paddle or plate is supported above a substrate by thermal-bimorph support arms. At least a portion of the plate and the underlying substrate are electrically conductive, thereby serving as electrodes. These electrodes collectively define a "sensing capacitor," the capacitance of which is a function of the electrodes' separation distance.

In operation, the plate of each sensing capacitor receives infrared radiation and heats up. The heat is conducted to the support arms, which include elements that bend in response to being heated. These elements are known as "thermal bimorphs" and their response is known as the "thermal bimorph effect." Perhaps the most familiar thermal bimorph is the bi-metallic strip within a thermostat. As the support arms bend, the plate moves up or down (depending on the design). Movement of the plate alters the spacing between the electrodes, thereby causing a change in the capacitance of the sensing capacitor. In this fashion, radiation that is incident on the plate is sensed as a change in capacitance. The change in capacitance is captured by read-out electronics and can be quantified and interpreted to provide an image, such as in an IR camera. (See, e.g., U.S. Pat. No. 6,118,124, etc.).

Early versions of these MEMS sensors, however, were highly sensitive to changes in ambient temperature. The sensor substrate, which provides a thermal connection to the environment outside the focal plane array, provides a conduit for heat to and from the support arm. Ambient temperature changes, therefore, resulted in a perceived change in background light level or sensor sensitivity across the sensor array.

To mitigate the problems due to temperature sensitivity, thermally-compensated MEMS sensors were developed. Such sensors have been disclosed by: 1) J. Zhao in "High Sensitivity Photomechanical MW-LWIR Imaging using an Uncooled MEMS Microcantilever Array and Optical Readout," published Mar. 28, 2005; 2) T. Ishizuya, et al., in "160× 120 Pixels Optically Readable Bimaterial Infrared Detector," published Jan. 20, 2002; and 3) Corbeil et al., in "Self Leveling uncooled microcantilever thermal detector," published Aug. 12, 2002. In these devices, each support arm includes two thermal actuators designed to oppose one another in response to a slowly occurring change in temperature. These thermal actuators are separated by a thermal isolator, which enables the sensor to be responsive to incident radiation yet be relatively unresponsive to an ambient temperature change. Temperature compensation of up to 90-95% has been demonstrated with these devices.

Notwithstanding their improved resistance to temperature variation, prior-art thermally-compensated MEMS sensors do have some drawbacks. First, the responsivity of the opposing thermal actuators, as disclosed, is not identical. As a result, an ambient temperature change will still induce some small residual movement of the sensor paddle—as evidenced by the fact that only 90-95% compensation has been demonstrated. Second, the additional support arm structure needed to add a second thermal actuator and thermal isolator increases the area required for purposes other than radiation absorption. As a result, the optical fill-factor of prior-art thermally-compensated radiation sensors is impaired.

SUMMARY OF THE INVENTION

The present invention provides a radiation sensor which can be fabricated as part of a focal plane array that has high optical fill-factor.

The radiation sensors disclosed herein each comprise a radiation absorbing plate that is held above a substrate electrode via support arms. The optically-active portion of an individual sensor is defined by the area of its plate. The support arms comprise thermal actuators which change the spacing between the plate and the substrate in response to heat caused by incident radiation. The plate and substrate electrode together compose a capacitor arrangement whose capacitance is a function of the intensity of the radiation incident on the sensor's plate.

Each support arm comprises a first region having at least one thermal actuator and a second region comprising a thermal isolator. In some embodiments, the first and second regions are fabricated in different planes above the substrate. In some embodiments, a radiation absorbing plate is also fabricated in the first plane. In some embodiments, the first region is fabricated in a first plane above the substrate, the second region is fabricated in second plane above the substrate, and a radiation absorbing plate is fabricated in a third plane above the substrate. As a result, at least a portion of a first sensor can be formed directly above at least a portion of a second sensor. In other words, the footprints of adjacent sensors can overlap. An array of such sensors, therefore, exhibits an increased optical fill-factor since the plates of adjacent sensors can be closer together than in a non-overlapped configuration.

In some embodiments, features of an individual sensor can be fabricated above other features of the same sensor, thereby reducing the sensor's footprint from that of prior-art sensors. In some of these embodiments, at least a portion of a first sensor also overlaps at least a portion of a second sensor.

In some embodiments, each support arm comprises a pair of thermal actuators having substantially identical thermal responsivity. One thermal actuator is thermally-coupled to the plate, while the other thermal actuator is thermally-coupled to the substrate. These thermal actuators act in opposition to one another, and are separated by a thermal isolator that slows the flow of heat between the thermal actuators. As a result, the support arms respond to rapid changes of temperature (such as heating caused by absorbed radiation) but do not substantially respond to slowly occurring temperature changes (such as a change of ambient temperature). By virtue of their substantially identical responsivity, the opposing thermal actuators of the present invention provide thermal compensation superior to that exhibited by thermally-compensated radiation sensors known in the prior-art.

In some embodiments, each support arm comprises multiple thermal actuators. At least two of these thermal actuators are fabricated on different planes above the substrate. In some embodiments, a thermal actuator that is fabricated on a first plane above the substrate overlaps at least a portion of a thermal actuator that is fabricated on a second plane above the substrate. In some embodiments, at least a portion of a support arm overlaps at least a portion of a radiation absorbing plate.

The illustrative embodiment of the present invention comprises a substrate having a first substrate electrode and a second substrate electrode; a first sensor, wherein the first sensor comprises; (a) a first plate for converting incident radiation into heat, wherein the first plate is physically adapted to conduct electricity and to conduct heat; and (b) a first support arm for supporting the first plate above the first substrate electrode; and a second sensor, wherein the second sensor comprises; (a) a second plate for converting incident radiation into heat, wherein the second plate is physically adapted to conduct electricity and to conduct heat; and (b) a second support arm for supporting the second plate above the second substrate electrode; wherein at least a portion of the second support arm interposes at least a portion of the first sensor and the substrate.

DETAILED DESCRIPTION

The following terms are defined for use in this Specification, including the appended claims:

Mechanically-coupled means that two or more objects interact with one another such that movement of one of the objects affects the other object. For example, consider an actuator and a platform. When triggered, the actuator causes the platform to move. The actuator and the platform are therefore considered to be "mechanically-coupled." Mechanically-coupled devices can be, but are not necessarily, physically coupled. In particular, two devices that interact with each other through an intermediate medium are considered to be mechanically coupled. Continuing with the example of the platform and the actuator, if the platform supports a load such that the load moves when the platform moves (due to the actuator), then the actuator and the load are considered to be mechanically coupled as well.

Electrically-coupled means that two objects are in electrical contact. This can be via direct physical contact (e.g., a plug in an electrical outlet, etc.), via an electrically-conductive intermediate (e.g., a wire or conductive trace that connects devices, etc.), or via intermediate devices, etc. (e.g., a resistor Monolithically-integrated means formed either: in the body of a substrate, typically by etching into the substrate or; on the surface of the substrate, typically by patterning layers disposed on the surface.

Thermal Bimorph means a structure (e.g., beam, etc.) that exhibits thermal bimorph behavior (i.e., thermally-induced bending response). Thermal bimorph behavior can be created in single-layer (single material) structures, bi-layer (bi-material) structures, or in structures that have more than two layers comprising two or more materials. In other words, notwithstanding the prefix "bi," a thermal bimorph can have more or less than two discrete layers comprising more or less than two different materials.

Corrugations means a series of alternating ridges and trenches, wherein one ridge and one trench collectively define a "corrugation."

Other terms will be defined, as appropriate, throughout this specification.

Figure 1:
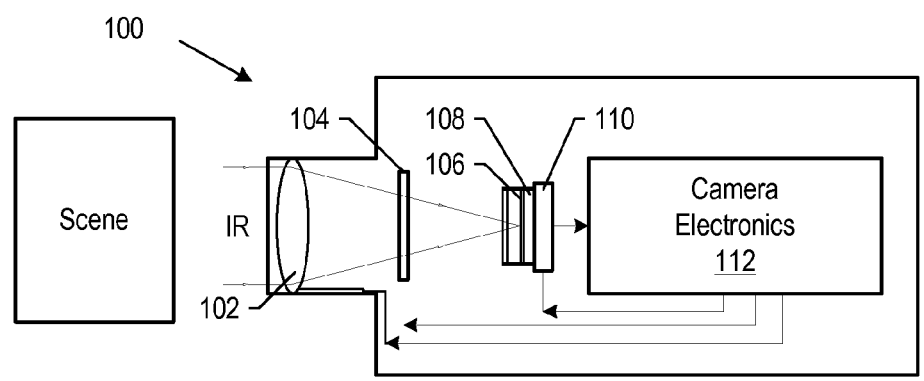
FIG. 1 depicts details of an infrared camera in accordance with an illustrative embodiment of the present invention.

FIG. 1 depicts elements of IR camera 100, including IR imaging optics 102, shutter 104, sensor array 106, read-out integrated circuit 108, temperature stabilizer 110, and camera electronics 112, interrelated as shown, in accordance with an illustrative embodiment of the present invention.

IR imaging optics 102 include one or more lenses that receive radiant energy, such as infrared radiation. IR radiation that is received by IR imaging optics 102 is directed toward shutter 104. The shutter controls the amount of radiation that is directed toward sensor array 106. Those skilled in the art will know how to make, specify, and use IR imaging optics 102 and shutter 104.

Sensor array 106 receives the radiant energy that is captured by IR imaging optics 102 and admitted by shutter 104. Sensor array 106 is located at the focal point of IR imaging optics 102 and is, therefore, properly termed a "focal plane array." As described later in this specification, sensor array 106 comprises an array of micromechanical capacitive sensors that respond to IR. These sensors have support arms that incorporate a corrugated thermal bimorph, in accordance with the illustrative embodiment of the present invention.

In response to the received radiation, the capacitance of the various sensors of sensor array 106 changes. These capacitances are "read" or "extracted" by read-out integrated circuit ("ROIC") 108, in known fashion. The ROIC generates voltage signals that are indicative of the extracted capacitances. ROIC 108 performs various other functions as well, including signal conditioning and amplification. Those skilled in the art will know how to use ROIC 108 to extract the capacitance of the various sensors in sensor array 106 and provide a voltage signal indicative thereof. In the illustrative embodiment sensor array 106 is monolithically-integrated with ROIC 108. It will be clear to those skilled in the art, however, how to make and use alternative embodiments of the present invention wherein sensor array 106 is packaged with ROIC 108 using another appropriate technology such as:

i. hybrid integration technology; or
  ii. multi-chip module integration technology; or
  iii. conventional integrated circuit packaging; or
  iv. any combination of i, ii, and iii.

Temperature stabilizer 110 ensures that sensor array 106 is thermally isolated from its environment, other than from the received IR. Camera electronics 112 includes various amplification, offset, and gain-control electronics, multiplexing and A-to-D circuitry, a camera-control microprocessor, various external control electronics, digital read-out and the like. In a nutshell, camera electronics 112 receives the voltage signals from ROIC 108 and processes the signals into an image. Camera electronics 112 also control the focus of IR imaging optics 102 and control shutter 104 and temperature stabilizer 110. Those skilled in the art will be familiar with the design and use of the various devices and circuits that compose camera electronics 112 and know how to integrate sensor array 106 therewith.

Figure 2A:
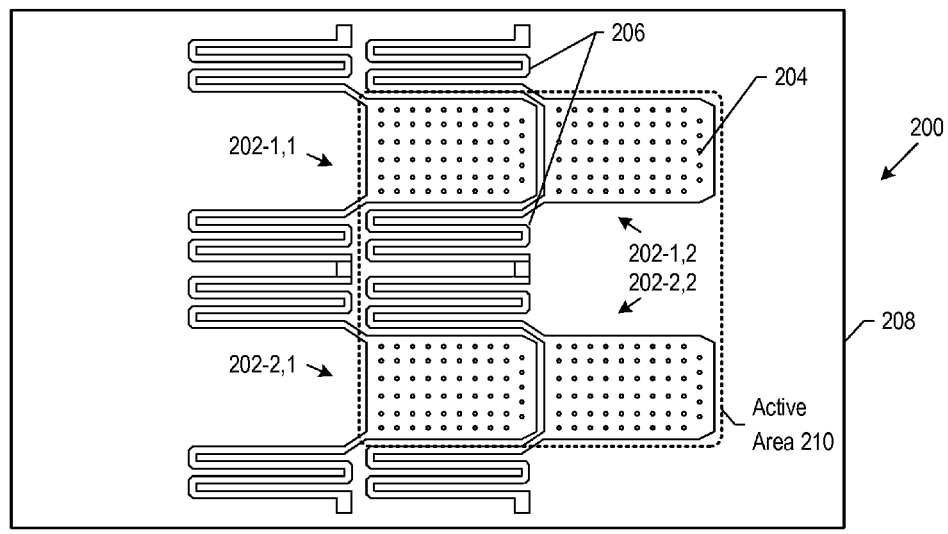
FIG. 2A depicts a plan view of a portion of a prior-art focal plane array.

FIG. 2A depicts a plan view of a portion of a prior-art focal plane array. Focal plane array 200 comprises a two-dimensional array of substantially identical capacitance sensors 202-1,1 through 202-2,2 (referred to collectively as "sensors 202"), each of which defines a "pixel" of the array. Only a few (four) sensors are depicted in focal plane array 200. Focal plane array 200 would typically be implemented as a much larger array, such as a 160×120 pixel array, which includes 19,200 sensors 202.

Each sensor 202 is substantially identical to each other sensor 202 and comprises a plate 204 and support arms 206. Plate 204 absorbs incident radiation and converts it to heat. Support arms 206 support plate 204 above substrate 208. Substrate 208 comprises substrate electrodes (not shown) under each plate 204. Each plate 204 and its associated substrate electrode form a variable capacitor whose capacitance is a function of the height at which plate 204 is suspended above its associated substrate electrode.

Support arms 206 comprise at least one thermal actuator (not shown). When plate 204 converts incident radiation into heat, the heat is conducted to at least one thermal actuator in support arms 206. A change in the amount of heat conducted to the thermal actuator results in a change in the height at which plate 204 is held above the substrate. As a result, each sensor 202 provides a capacitive signal based on the intensity of the radiation incident upon it. The two-dimensional area that includes all of the radiation absorbing plates 204 in focal plane array 200 defines optically-active area 210. The combined area of all of plates 204, as a percentage of active area 210, determines the "fill-factor" of focal plane array 200. In order to increase the fill-factor of focal plane array 200, each of sensors 202 "nests" within the support arms of a neighboring sensor.

Figure 2B:
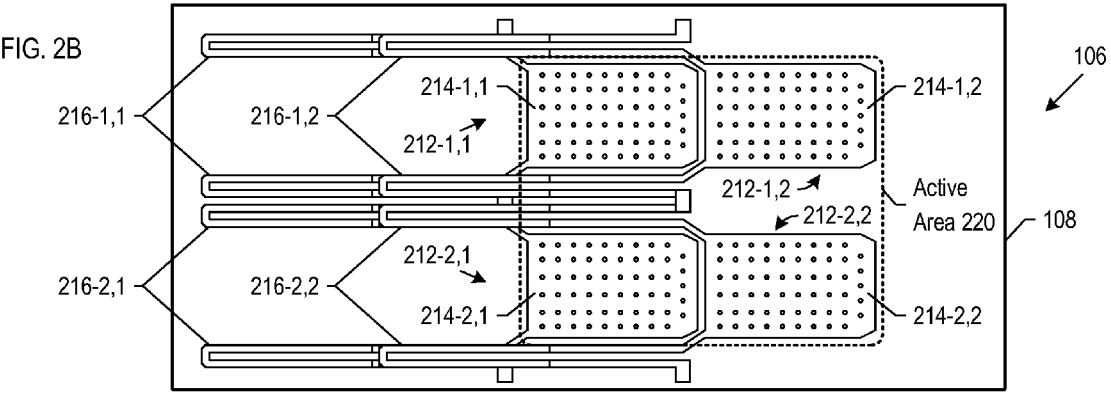
FIG. 2B depicts a plan view of a portion of a focal plane array in accordance with the illustrative embodiment of the present invention.

FIG. 2B depicts a plan view of a portion of a focal plane array in accordance with the illustrative embodiment of the present invention. Focal plane array 106 comprises a two-dimensional array of substantially identical capacitance sensors 212-1,1 through 212-2,2 (referred to collectively as sensors 212), each of which defines a "pixel" of the array. As with focal plane array 200, only a few (four) sensors are depicted in focal plane array 106. Focal plane array 106 would typically be implemented as a much larger array, such as a 160×120 pixel array, which would include 19,200 sensors 212.

Each of sensors 212 comprises a plate 214 and support arms 216. For example, sensor 212-1,1 comprises plate 214-1,1 and support arms 216-1,1. Each plate 214 absorbs incident electromagnetic radiation and converts it to heat. Each pair of support arms 216 supports plate 214 above ROIC 108. Plate 214 and support arms 216 are thermally-coupled so heat due to absorbed radiation is conducted from the plate to the support arms.

Sensors 212 are formed on, and are monolithically-integrated with, ROIC 108. ROIC 108 comprises at least one substrate electrode (not shown) under each plate 214. As with sensors 202, each plate 214 and its associated substrate electrode form a variable capacitor whose capacitance is a function of the separation between the plate and electrode.

Although the illustrative embodiment comprises a sensor array that is formed on an ROIC, it will be clear to those skilled in the art, after reading this specification, how to make and use alternative embodiments of the present invention wherein sensor array is formed on a substrate that is not an ROIC. Suitable substrates for supporting the formation of sensors 212 include, without limitation, silicon substrates, gallium arsenide substrates, silica substrates, ceramic substrates, and glass substrates.

Although in the illustrative embodiment sensor array 106 is monolithically-integrated with ROIC 108, it will be clear to those skilled in the art how to make and use alternative embodiments of the present invention wherein sensor array 106 is packaged with ROIC 108 using another appropriate technology such as:

i. hybrid integration technology; or
  ii. multi-chip module integration technology; or
  iii. conventional integrated circuit packaging; or
  iv. any combination of i, ii, and iii.

In similar fashion to sensors 202, sensors 212 are designed to "nest" with one another in order to increase the fill-factor of the array. In contrast to the prior-art, however, the present invention nests sensors 212 in three dimensions rather than just two dimensions. This third dimension of nesting provides a fill-factor for focal plane array 106 that is improved beyond that achievable in the prior-art.

In the prior art, sensors 202 are typically formed from a planar layer of structural material. This planar layer may include one or more sandwiched layers of materials such as silicon carbide, dielectric layers, and the like. The plate and support arms are formed from this planar layer in "cookie-cutter" fashion. As a result, all of the sensors are formed within the same plane and there is can be no vertical overlap between the structural materials associated with adjacent sensors. The fill factor of focal plane array 200, therefore, is limited by the area necessary for the support arms of each sensor.

In the present invention, on the other hand, a portion of support arms 216 are formed to overlap, vertically, a portion of the support arms of an adjacent sensor. For example, a portion of support arms 216-1,2 overlaps support arms 216-1,1, while a portion of support arms 216-2,2 overlaps support arms 216-1,1. As a result, the percentage of active area 220 consumed by support arms 216 is reduced, and the fill-factor of active area 220 is increased from that of active area 210.

Figure 3A:
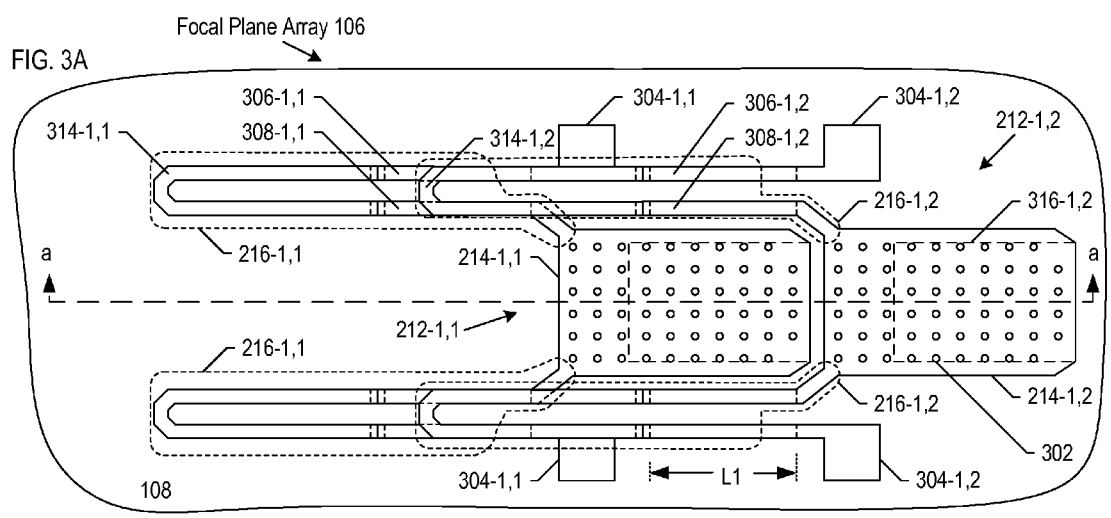
FIG. 3A depicts a plan view of a region of a representative sensor array, in its unreleased state, in accordance with the illustrative embodiment of the present invention.
Figure 3B:
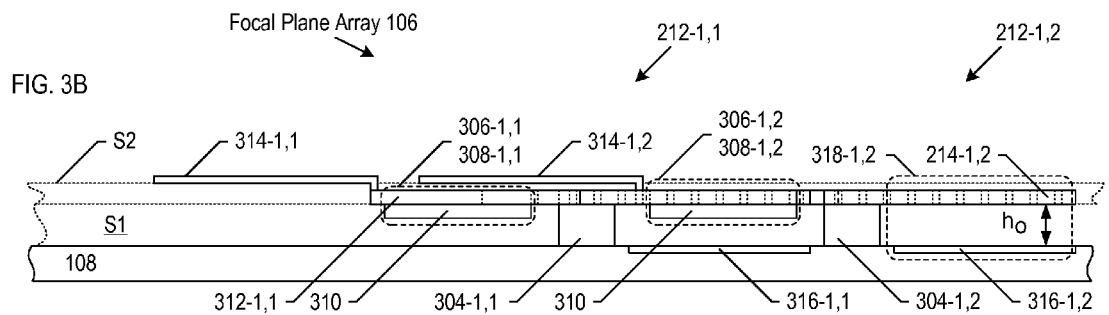
FIG. 3B depicts a cross-sectional view of a region of a representative sensor array, in its unreleased state, in accordance with the illustrative embodiment of the present invention.

FIGS. 3A and 3B depict a plan view and cross-sectional view (respectively) of a region of a representative sensor array, in its unreleased state, in accordance with the illustrative embodiment of the present invention. The cross-sectional view shown in FIG. 3B is taken through line a-a as shown in FIG. 3A. Each sensor 212 comprises a plate 214, and support arms 216. Support arms 216 are anchored to the substrate (i.e., ROIC 108) at substrate anchors 304. Each of support arms 216 comprises a substrate thermal bimorph 306, a plate thermal bimorph 308, and a thermal isolator 314. For example, sensor 212-1,2 comprises plate 214-1,2 and support arms 216-1,2, as discussed above and with respect to FIG. 2B. Support arms 216-1,2 each comprise a substrate thermal bimorph 306-1,2, a plate thermal bimorph 308-1,2, and a thermal isolator 314-1,2. Support arms 216-1,2 are each mechanically and electrically anchored to ROIC 108 at a substrate anchor 304-1,2. In the following discussion, generic element numbers will be used when discussing characteristics of an element that is common to all sensors. For example, support arm 216 will be used when describing characteristics common to each of support arms 216-1,1 through 216-2,2, etc. In cases where the identity of a particular sensor is of note, however, the unique element number will be used (e.g., support arm 216-1,2, etc.).

Figure 4:
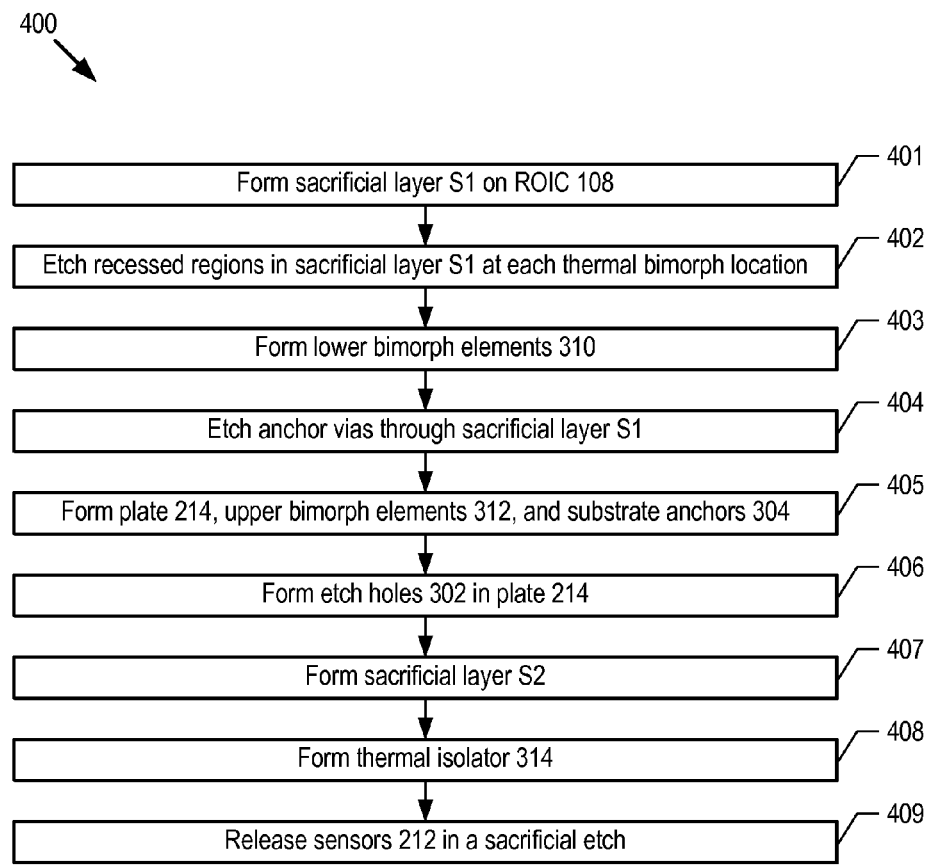
FIG. 4 describes operations suitable for forming a radiation sensor, in accordance with the illustrative embodiment.

Referring now to FIG. 4 and with continuing reference to FIGS. 3A and 3B, sensor 212 is described in conjunction with method 400, which describes operations suitable for forming sensor 212, in accordance with the illustrative embodiment.

Method 400 begins with operation 401, in which sacrificial layer S1 is formed on ROIC 108. Sacrificial layer S1 comprises a material which can be etched selectively over the materials that compose sensor 212 in order to release the mechanically-active regions of sensor 212 from ROIC 108. The use of sacrificial materials is well-known to those of ordinary skill in MEMS technology, and the specific choice of sacrificial material S1 is dependent upon the structural materials used to form sensor 212. Sacrificial materials include, without limitation, silicon dioxides, polysilicon, amorphous silicon, silicon nitrides, silicon, and doped or undoped glasses such as phosphosilicate glass (PSG), borophosphosilicate glass (BPSG), and the like.

At operation 402, recesses are formed in sacrificial layer S1 in well-known fashion. These recesses are formed with a length L1 and act much like a conventional mold during the formation of thermal bimorphs 306 and 308. The length of this recess defines the length of thermal bimorphs 306 and 308.

At operations 403 and 404, thermal bimorph elements 306 and 308 are formed by forming a layer stack comprising lower bimorph elements 310 and upper bimorph elements 312. Lower bimorph elements 310 comprise a material having a relatively higher TEC and upper bimorph elements 312 have a relatively lower TEC.

At operation 403, lower bimorph elements 310 are formed by the deposition of a full-surface layer of the relatively higher TEC material. In some embodiments, lower bimorph elements comprise a metal such as aluminum, gold, and the like. After deposition of this full-surface layer on the substrate, the surface is planarized using chemical-mechanical polishing (CMP). After CMP, only the recesses formed in operation 402 are filled with the relatively higher TEC material. In some embodiments, operation 403 does not include CMP and the surface is not planarized.

At operation 404, anchor vias to ROIC 108 are formed through sacrificial layer S1 in well-known fashion.

At operation 405, a full-surface layer of structural material is deposited on the substrate. This layer of structural material is patterned in well-known fashion to form plates 214, upper bimorph elements 312, and substrate anchors 304. Substrate anchors are formed in the anchor vias formed in operation 404. This layer of structural material is characterized by a relatively lower TEC, as compared to lower bimorph elements 310. In some embodiments, this structural layer comprises a dielectric layer(s), such as silicon dioxide and/or silicon oxynitride and/or silicon nitride, and/or a semiconductor such as hydrogenated amorphous silicon carbide.

It will be appreciated by those skilled in the art that any of a wide variety of materials can be selected, as a function of application specifics, to provide the relatively-lower and relatively-higher TEC layers of a thermal bimorph in accordance with the illustrative embodiment of the present invention. For example, the material having the relatively higher TEC does not need to be limited to metals. In particular, high TEC plastics and polymeric materials can be used. A non-limiting list of examples of such non-metallics include: polycarbonate, polypropylene, polyethylene, Teflon, nylon, Lucite, polyamide, and various types of photoresist.

The responsivity of a thermal bimorph is a function of its length. By virtue of their formation in the recesses formed in operation 402, substrate thermal bimorph 306 and plate thermal bimorph 308 each have a length equal to L1. The fact that substrate thermal bimorph 306 and plate thermal bimorph 308 have equal lengths enables sensor 212 to effectively compensate for slow variations in substrate (or ambient) temperature. In some alternative embodiments, substrate thermal bimorph and plate thermal bimorph have a slight offset in their responsivities so that a substrate temperature controller can be used to tune quiescent-state plate height $h_o$ as desired.

Since the metal layer, which has the relatively higher TEC, is located beneath the dielectric layer, which has the relatively lower TEC, thermal bimorphs 306 and 308 will bend "upwards" (i.e., away from ROIC 108) in response to increasing temperature. Upward bending is advantageous because it improves dynamic range, since greater range of movement is permitted. Also, upward movement decreases the likelihood of inadvertent contact with the substrate, which is likely to result in stiction (i.e., permanent attachment of the movable element to the substrate). Of course, the material layers can be inverted (i.e., layer with the lower TEC beneath the layer with the higher TEC) to provide downward bending upon heating, if desired.

Plate 214 functions as a radiant-energy absorber and the region between plate 214 and substrate electrode 316 of ROIC 108 forms a resonant cavity that enhances the absorption of radiation in the range of interest. Together with substrate electrode 316, plate 214 also forms a movable electrode as part of variable gap capacitor 318. A resonant cavity for radiation within the range of visible light through long wave infrared radiation can be established with proper selection of quiescent-state plate height $h_0$.

Infrared radiation is also absorbed by the materials that compose plate 214. Plate 214 comprises a titanium nitride layer that serves as an impedance matching layer to match the free space impedance of the resonant cavity. The titanium nitride layer also imparts electrical conductivity, which is required for plate 214 to serve as a movable electrode in variable-gap capacitor 318.

In some embodiments, the structural material from which plate 214, upper bimorph elements 312 and substrate anchors 304 are formed comprises an overlying layer of at least one layer of electrically-conductive material and at least one underlying layer of dielectric material. Suitable materials for inclusion in the overlying layer include, without limitation, titanium, titanium-tungsten, titanium-nitride-tungsten, titanium-nitride, chrome, and nichrome. Suitable materials for inclusion in the underlying layer of dielectric material include, without limitation, silicon dioxide, silicon nitride, and silicon oxynitride.

The electrically-conductive material and underlying dielectric materials are chosen to provide a plate 214 that is a free-space impedance match for the electromagnetic radiation of interest. In some embodiments, this impedance match is approximately 377 ohms.

At operation 406, holes 302 are formed in plate 214 in well-known fashion. Holes 302 serve to enable the delivery of etchant to remove sacrificial material S1 during a subsequent release etch used to free the mechanically-active portions of sensors 212 from ROIC 108.

At operation 407, sacrificial layer S2 is formed on the substrate. Sacrificial layer S2 comprises the same material as sacrificial layer S1. Sacrificial layer S2 serves to separate thermal isolators 314 from underlying structural material of plates 214, upper bimorph elements 312 and substrate anchors 304. Sacrificial layer S2 is deposited as a full-surface layer. This layer is then patterned to open vias to the upper surface of upper bimorph elements 312.

At operation 408, thermal isolators 314 are formed by full layer deposition and patterning in well-known fashion. Thermal isolators 314 are mechanically-, electrically-, and thermally-coupled to upper bimorph elements 310 at the vias formed in operation 407.

A thermal isolator 314, substrate thermal bimorph 306 and a plate thermal bimorph 308 together compose each support arms 216. A highly thermally-conductive layer (not shown) provides a low thermal resistance path between substrate thermal bimorph 306 and substrate anchor 304. In similar fashion, a highly thermally-conductive layer (not shown) provides a low thermal resistance path between plate thermal bimorph 308 and plate 214. By virtue of these thermally-conductive layers, substrate thermal bimorph 306 remains at substantially the same temperature as ROIC 108, while plate thermal bimorph 308 remains at substantially the same temperature as plate 214.

Thermal isolator 314 interposes and impedes the flow of heat between substrate thermal bimorph 306 and plate thermal bimorph 308. In some embodiments, thermal isolator 314 comprises the same material as the underlying dielectric layer that composes plate 214. The thermal conductance of thermal isolator 314 is defined as $G_{th}=2K_{th}A_d/L$, where $K_{th}$ is the thermal conductivity of the material that composes thermal isolator 314, $A_d$ is the cross sectional area of thermal isolator 314, and L is its length. The rate of heat flow between the bimorphs, therefore, is inversely proportional to the length of thermal isolator 314.

Since plate thermal bimorph 308 is connected to plate 214 via a highly thermally conductive path (i.e., is "thermally shorted"), the rate at which heat flows between them is very high. Therefore, plate thermal bimorph 308 responds quickly when plate 214 converts absorbed radiation into heat. Such rapid response is typically desirable. Similarly, since substrate thermal bimorph 306 is thermally shorted to ROIC 108, it responds quickly to changes in substrate temperature. The thermal response time across each of substrate thermal bimorph 306 and plate thermal bimorph 308 is typically within the range of 0.5 to 10 microseconds.

Substrate thermal bimorph 306 and plate thermal bimorph 308 have responsivities that are substantially matched and they are arranged so as to operate in opposition to one another. As a result, in order to enable sensor 212 to detect incident radiation, the radiation must cause a thermal gradient to exist between the two thermal bimorphs. To that end, thermal isolator 314 is located between the thermal bimorphs. The thermal conductance of thermal isolator 314 determines the rate at which the sensor responds to absorbed radiation versus the rate at which the device will respond to substrate temperature changes. The value of its thermal conductivity is chosen to achieve a desired ratio between sensitivity to substrate temperature and speed of response to incident radiation.

For typical sensor designs, the thermal response time across thermal isolator 314 is within the range of 1 to 30 milliseconds. In some embodiments, the thermal conductance of thermal isolator 314 is made small to increase the thermal isolation between substrate thermal bimorph 306 and plate thermal bimorph 308. In some embodiments, the thermal conductance of thermal isolator 314 is made large to decrease the thermal isolation between substrate thermal bimorph 306 and plate thermal bimorph 308.

In some embodiments, quiescent-state plate height $h_o$ is also a function of a material stress and/or a material stress gradient through the thickness of thermal isolator 314. The stress and stress gradient in a thin-film material (e.g., silicon dioxide, silicon oxynitride, and the like) can be selected by appropriately selecting the conditions under which it is deposited, such as deposition temperature, precursor gasses, substrate temperature, etc. Quiescent-state plate height $h_o$ can be controlled, therefore, by selection of a material stress and/or material stress gradient.

At operation 409, plates 214 and support arms 216 are made mechanically-active by removing sacrificial layers S1 and S2 in a sacrificial etch. This sacrificial etch selectively removes sacrificial layers S1 and S2, thereby releasing plate 214 (and support arms 216) from underlying ROIC 108. In some embodiments, plate 214 also includes ribs (not shown), which add structural rigidity. Substrate anchors 304 are in intimate contact with ROIC 108 (i.e., no sacrificial material temporarily underlies substrate anchor 108). Substrate anchors 304 provide both mechanical contact and electrical contact between support arms 216 and ROIC 108.

In some embodiments, sensor 212 comprises one or more elements that are formed using techniques other than full-surface deposition and subtractive patterning. Suitable techniques for formation of such elements include, without limitation, selective area growth, material lift-off techniques, electroplating, electroless plating, and the like.

Figure 3C:
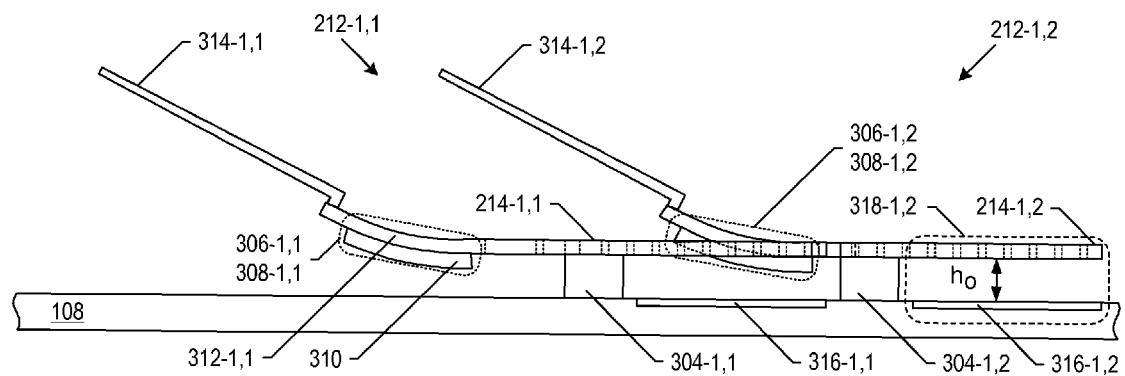
FIG. 3C depicts a cross-sectional view of a representative individual sensor, after release, in accordance with the illustrative embodiment of the present invention.

FIG. 3C depicts a cross-sectional view of a representative individual sensor, after release, in accordance with the illustrative embodiment of the present invention. FIG. 3C depicts the sensor in its quiescent state. In other words, FIG. 3B depicts sensors 212-1,1 and 212-1,2 prior to operation 409, while FIG. 3C depicts sensors 212-1,1 and 212-1,2 after operation 409.

Substrate thermal bimorphs 306 and plate thermal bimorphs 308 are depicted in FIG. 3C as having equilibrated after an increase in ambient temperature, but without a response to incident radiation. Since lower bimorph elements 310 comprises material having a TEC that is higher than that of upper bimorph elements 312, the thermal bimorphs respond to the increased ambient temperature by bending upward. Substrate thermal bimorphs 306 and plate thermal bimorphs 308 are designed with substantially identical responsivity. The separation between plates 214 and their respective substrate electrodes 316, therefore, remains at quiescent-state plate height $h_o$ after their release from ROIC 108. The thermal response and/or residual stress characteristics of the thermal bimorphs, however, causes thermal isolators 314-1,1 and 314-1,2 to project above their as-fabricated positions.

In the illustrative embodiment, the thermal actuators that comprise substrate thermal bimorphs 306 and plate thermal bimorphs 308 have equal responsivity to slowly occurring temperature changes, such as a change in ambient temperature. This equal responsivity is derived from the fact that the thermal bimorphs are of substantially identical lengths. In addition, their configuration within support arms 216 is also substantially matched. In other words, the length of non-actuated support arm material to which they are attached is the same.

Attempts have been made in the prior art to mitigate problems due to ambient temperature sensitivity. Such was the motivation for the development of thermally-compensated MEMS sensors such as those disclosed by Zhao, Ishizuya, and Corbeil, as discussed in the background. In these devices, each support arm includes two thermal bimorphs designed to oppose one another in response to a slowly occurring change in temperature. Temperature compensation of up to 90-95% has been demonstrated with these devices. The thermal bimorphs in these prior art sensors are not identically configured within their supports arms (e.g., they have different lengths, shapes, etc.). As a consequence, these sensors are unable to completely compensate for ambient temperature changes (i.e., 5-10% temperature dependency remains).

The present inventors recognized that even a slight difference in length or shape of the thermal actuators within a support arm can have a not insignificant affect on their ability to provide thermal compensation. The present invention derives advantage over the prior-art by the fact that the substrate thermal actuator and plate thermal actuator are 1) substantially identically-configured in both length and structure, AND 2) located in close proximity to one another (within a few microns or less). As a result, material and process variations (inherent to any fabrication process) have a reduced impact on the matched responsivities of the substrate and plate thermal actuators disclosed herein.

Focal plane array 106 must survive and/or operate during exposure to a wide range of temperatures. Ambient temperature during shipping/storage/operation can span a range of at least −50° C. to +100° C. When the ambient temperature of the sensor array is reduced sufficiently, the thermal bimorphs exhibit a downward bend. As a result, thermal isolators 314 could contact the structural material over which they are formed. For example, thermal isolator 314-1,2 could be driven into contact with upper bimorph element 312-1,1. "In-use stiction" is a well-known failure mechanism of MEMS devices, and it will be appreciated by those skilled in the art that it is desirable to avoid it. The design of sensors 212, therefore, takes into account the temperature range over which sensors 212 will be exposed. In some embodiments, therefore, sacrificial layer S2 is thick enough to accommodate the maximum downward bending of the thermal bimorphs (which occurs at the lowest temperature). In some embodiments where lower bimorph element 310 comprises material having the relatively lower TEC, sacrificial layer S2 is thick enough to accommodate the maximum downward bending of the thermal bimorphs (which occurs at the highest temperature).

In some embodiments, $h_0$ is also a function of any residual stress or residual stress gradient in one or more of lower bimorph element 310, upper bimorph element 312, thermal isolator 314, or plate 214. As a result, height $h_0$, and/or the angle formed by plate 214 and ROIC 108 is also a function of any of these residual stresses or residual stress gradients. Although the illustrative embodiment comprises a sensor wherein plate 214 is parallel to the substrate (i.e., ROIC 108) when the plate is in its quiescent state, it will be clear to those skilled in the art, after reading this specification, how to make and use alternative embodiments of the present invention wherein plate 214 is in a non-parallel relationship with the substrate when plate 214 is in its quiescent state. It will be apparent to those skilled in the art that in these alternative embodiments, thermal tuning can be used to control the separation distance and/or angle between plate 214 and ROIC 108.

The vertically-nested structure of focal plane array 106 provides additional benefit beyond improved optical fill-factor. First, sensors 212 exhibit reduced capacitive coupling between adjacent sensors. As a result, the signal-to-noise ratio of the sensor array is improved. Second, the thermal isolation between substrate thermal bimorph 306 and plate thermal bimorph 308 can be changed without affecting pixel-to-pixel spacing or the thermal responsivity of the thermal actuators in support arms 216.

Figure 5:
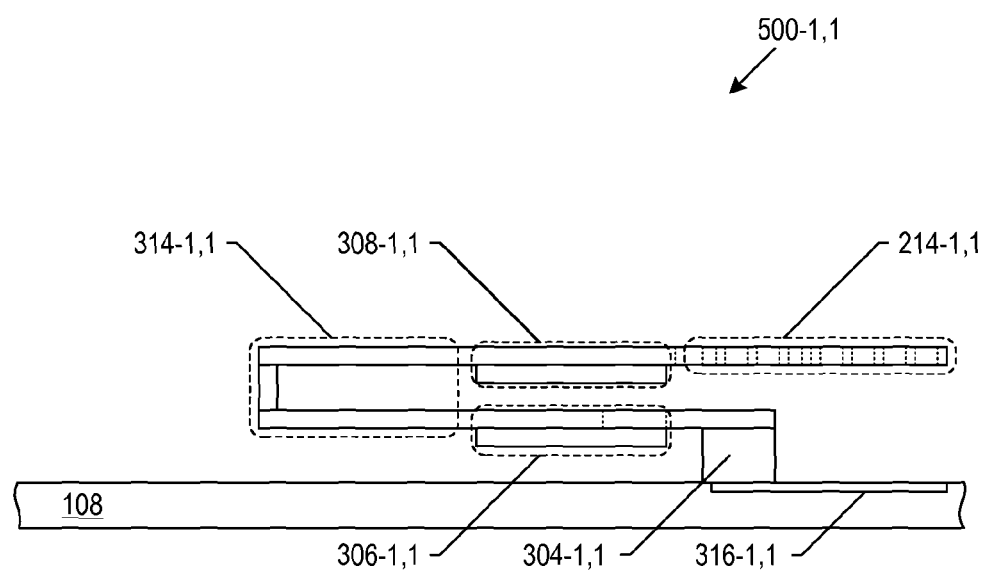
FIG. 5 depicts a cross-sectional view of details of a radiation sensor in accordance with an alternative embodiment of the present invention.

FIG. 5 depicts a cross-sectional view of details of a radiation sensor in accordance with an alternative embodiment of the present invention. Sensor 500-1,1 is analogous to sensor 212-1,1, and is representative of a single pixel of a focal-plane array.

Sensor 500-1,1 comprises the same structural components as sensor 212-1,1 (i.e., substrate anchors 304-1,1, plate 214-1,1, and support arms 216-1,1, each of which comprises a substrate thermal bimorph 306-1,1, a plate thermal bimorph 308-1,1, and a thermal isolator 314-1,1). In sensor 500-1,1, however, support arms 216-1,1 are formed in a plurality of planes above substrate 108. As a result, plate thermal bimorph 208-1,1 is arranged above substrate thermal bimorph 206-1,1 (i.e., substrate thermal bimorph 206-1,1 interposes plate thermal bimorph 208-1,1 and substrate 108). The substrate area required for sensor 500-1,1, therefore is reduced from that required for sensors known in the prior-art, and even that required for sensor 212-1,1.

It will be clear to those of ordinary skill in the art, after reading this specification, how to make and use other alternative embodiments of the present invention wherein the features of sensor 500-1,1, such as plate, thermal bimorphs, and/or thermal isolators, are arranged vertically in any order. In addition, it will be clear, after reading this specification, how to nest adjacent copies of sensor 500-1,1 in similar fashion to sensors 212-1,1 and 212-1,2, as depicted in FIGS. 3A-3C, to improve the optical fill-factor of a focal plane array comprising such sensors even further.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   (1) a substrate having a first substrate electrode and a second substrate electrode;
   (2) a first sensor, wherein said first sensor comprises;
      (a) a first plate for converting incident radiation into heat, wherein said first plate is physically adapted to conduct electricity and to conduct heat; and
      (b) a first support arm for supporting said first plate above said first substrate electrode, wherein said first support arm comprises a first actuator for controlling the height at which said first plate is supported above said first substrate electrode; and
   (3) a second sensor, wherein said second sensor comprises;
      (a) a second plate for converting incident radiation into heat, wherein said second plate is physically adapted to conduct electricity and to conduct heat; and (b) a second support arm for supporting said second plate above said second substrate electrode, wherein said second support arm comprises a second actuator for controlling the height at which said second plate is supported above said second substrate electrode;

wherein at least a portion of said second support arm overlaps at least a portion of said first support arm.

2. The apparatus of claim 1 wherein said first actuator comprises a thermal actuator.

3. The apparatus of claim 1 wherein at least a portion of said second support arm vertically interposes at least a portion of said first plate and said substrate.

4. The apparatus of claim 2 wherein said first thermal actuator comprises a first thermal bimorph, and wherein said first support arm is physically adapted to conduct heat between said first plate and said first thermal bimorph.

5. The apparatus of claim 4 wherein said first support arm further comprises a second thermal bimorph.

6. The apparatus of claim 5 wherein said first support arm is physically adapted to conduct heat between said substrate and said second thermal bimorph.

7. The apparatus of claim 5 wherein the responsivity of said first thermal bimorph and the responsivity of said second thermal bimorph are substantially equal.

8. The apparatus of claim 5 wherein said first thermal bimorph has a first length and a first shape, and wherein said second thermal bimorph has a second length and a second shape, and wherein said first length and said second length are substantially equal, and further wherein said first shape and said second shape are substantially identical.

9. An apparatus comprising:
(1) a substrate;
(2) a first sensor disposed on said substrate, wherein said first sensor comprises;
  (a) a first plate for converting incident radiation into heat, wherein said first plate is physically adapted to conduct electricity and to conduct heat; and
  (b) a first support arm for supporting said first plate above said substrate, wherein said first support arm comprises a first thermal bimorph having a first length and a first shape and a second thermal bimorph having a second length and a second shape, and wherein said first length and said second length are substantially equal, and further wherein said first shape and said second shape are substantially identical; and
(3) a second sensor disposed on said substrate, wherein said second sensor comprises;
  (a) a second plate for converting incident radiation into heat, wherein said second plate is physically adapted to conduct electricity and to conduct heat; and
  (b) a second support arm for supporting said second plate above said substrate, wherein said second support arm comprises a third thermal bimorph having a third length and a third shape and a fourth thermal bimorph having a fourth length and a fourth shape, and wherein said third length and said fourth length are substantially equal, and further wherein said third shape and said fourth shape are substantially identical;

wherein at least a portion of said second support arm overlaps said substrate and at least a portion of said first sensor.

10. The apparatus of claim 9 wherein at least a portion of said first thermal bimorph vertically interposes at least a portion of said second thermal bimorph and said substrate.

11. The apparatus of claim 9 wherein said first support arm further comprises a first thermal isolator, and wherein said first thermal isolator overlaps said substrate.

12. The apparatus of claim 11 wherein said first thermal isolator comprises a first isolator portion and a second isolator portion, and wherein said first isolator portion overlaps said second isolator portion and said substrate.

13. An apparatus comprising:
a first sensor disposed on a substrate, wherein said first sensor comprises:
  a first plate for converting incident radiation into heat, wherein said first plate is physically adapted to conduct electricity and to conduct heat; and
  a first support arm for supporting said first plate above said substrate, wherein said first support arm comprises a first thermal bimorph having a first shape and a first responsivity and a second thermal bimorph having a second shape and a second responsivity, and wherein said first shape and said second shape are substantially identical, and further wherein said first responsivity and said second responsivity are substantially equal;
a second sensor disposed on said substrate, wherein said second sensor comprising:
  a second plate for converting incident radiation into heat, wherein said second plate is physically adapted to conduct electricity and to conduct heat; and
  a second support arm for supporting said second plate above said substrate, wherein said second support arm comprises a third thermal bimorph having a third responsivity and a fourth thermal bimorph having a fourth responsivity, and wherein said third responsivity and said fourth responsivity are substantially equal;
wherein at least a portion of said second support arm overlaps at least a portion of said first sensor and said substrate.

14. The apparatus of claim 13 wherein said first thermal bimorph has a first length and said second thermal bimorph has a second length, and wherein said first length and said second length are substantially equal.

15. The apparatus of claim 13 wherein said third thermal bimorph has a third length and said fourth thermal bimorph has a fourth length, and wherein said third length and said fourth length are substantially equal.

* * * * *